US012226718B2

(12) United States Patent
Wartlick

(10) Patent No.: US 12,226,718 B2
(45) Date of Patent: Feb. 18, 2025

(54) FABRIC LAYER, FLAT MATERIAL, FILTER ELEMENT, FILTER AND METHOD FOR THE PRODUCTION OF A FABRIC LAYER

(71) Applicant: ARGO-HYTOS GROUP AG, Baar (CH)

(72) Inventor: Karl Wartlick, Oberderdingen (DE)

(73) Assignee: ARGO-HYTOS GROUP AG, Baar (CH)

( * ) Notice: Subject to any disclaimer, the term of this patent is extended or adjusted under 35 U.S.C. 154(b) by 426 days.

(21) Appl. No.: 17/663,301

(22) Filed: May 13, 2022

(65) Prior Publication Data

US 2022/0288509 A1    Sep. 15, 2022

Related U.S. Application Data

(63) Continuation of application No. 16/549,366, filed on Aug. 23, 2019, now Pat. No. 11,358,075.

(30) Foreign Application Priority Data

Apr. 11, 2019  (DE) ............... 10 2019 109 617.0
Apr. 11, 2019  (DE) ............... 20 2019 102 088.1

(51) Int. Cl.
  *B01D 29/21*   (2006.01)
  *B01D 39/08*   (2006.01)
  *B01D 46/52*   (2006.01)

(52) U.S. Cl.
  CPC ............ *B01D 29/21* (2013.01); *B01D 39/08* (2013.01); *B01D 46/521* (2013.01); *B01D 2239/065* (2013.01)

(58) Field of Classification Search
  CPC .. B01D 29/00; B01D 29/0093; B01D 29/016; B01D 39/00; B01D 39/08; B01D 39/083;
  (Continued)

(56) References Cited

U.S. PATENT DOCUMENTS 2,365,766 A  12/1944 Levier
5,713,399 A   2/1998 Collette
(Continued)

FOREIGN PATENT DOCUMENTS

CN   101854993    10/2010
CN   204509608 U   7/2015
(Continued)

OTHER PUBLICATIONS

Examination Report issued in corresponding Indian Application No. 201924038075, dated Dec. 23, 2020, 7 pages.
Office Action issued in Chinese Patent Application No. 201910955511.1, Jul. 2, 2021, 11 pages.
Smith, 7 Weave Patterns to Know, Education 101 Primers, Dec. 28, 2017, 19 pages.
Second Office Action issued in European Patent Application No. 19195274.6, Sep. 14, 2022, 8 pages.

*Primary Examiner* — Allison G Fitzsimmons
(74) *Attorney, Agent, or Firm* — HSML P.C.

(57) ABSTRACT

The invention relates to a fabric layer, in particular a protective fabric and/or backing fabric, for a corrugated or pleated flat material of a filter element, wherein the flat material comprises a plurality of pleats (17) or corrugations running parallel to one another, which form successive pleat or corrugation peaks (18) and pleat or corrugation troughs (19), which are connected to one another by a pleat flank, wherein a fluid can flow through the flat material, wherein the fabric layer comprises a first fabric region, in particular a first fabric strip (10), and at least one second fabric region, in particular a second fabric strip (11), the threads whereof, in particular weft threads (32), merge into one another, wherein the first fabric region, in particular the first fabric strip (10), comprises a first type of weave and the second fabric region, in particular the second fabric strip (11), a second type of weave, which differs from the first type of weave.

3 Claims, 4 Drawing Sheets

(58) Field of Classification Search
CPC ...... B01D 39/086; B01D 39/14; B01D 39/16; B01D 39/20; B01D 2239/00; B01D 2239/06; B01D 2239/0604; B01D 2239/0609; B01D 2239/0613; B01D 2239/0636; B01D 2239/0645; B01D 2239/10; B01D 2239/1291; B01D 29/07; B01D 29/111; B01D 29/21; B01D 29/232; B01D 29/58; D03D 1/00; D03D 1/0035; D03D 3/08; D03D 13/00; D03D 13/002; D03D 13/004; D03D 15/00; D03D 15/60; D03D 25/00; D04H 13/00; B65H 69/00; B65H 69/06; B65H 69/063; B65H 69/065; B65H 69/068; B65H 45/12; B65H 45/20; B65H 45/30
USPC .................................................... 210/493.1
See application file for complete search history.

(56) References Cited

U.S. PATENT DOCUMENTS

| | | |
|---|---|---|
| 10,349,685 B2 | 7/2019 | Romero et al. |
| 2010/0224554 A1 | 9/2010 | Schindelin et al. |
| 2014/0034580 A1 | 2/2014 | Chen |
| 2017/0233904 A1 | 8/2017 | Weening |

FOREIGN PATENT DOCUMENTS

| | | |
|---|---|---|
| DE | 102007040892 | 2/2009 |
| DE | 102010025218 | 12/2011 |
| EP | 3 302 113 | 4/2018 |
| WO | 2009026978 | 3/2009 |

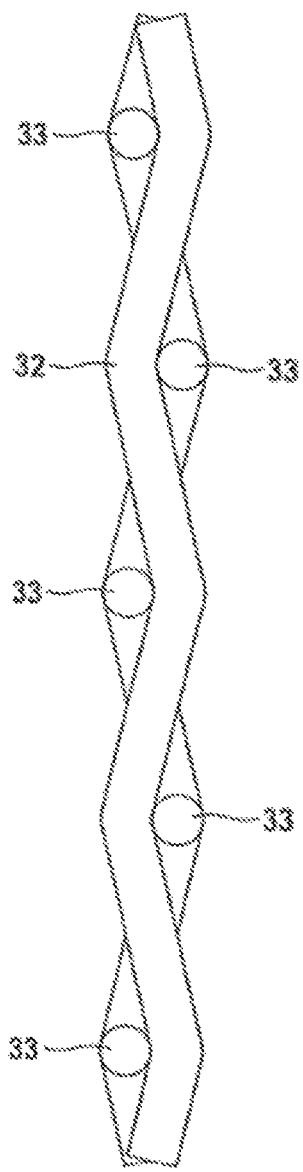
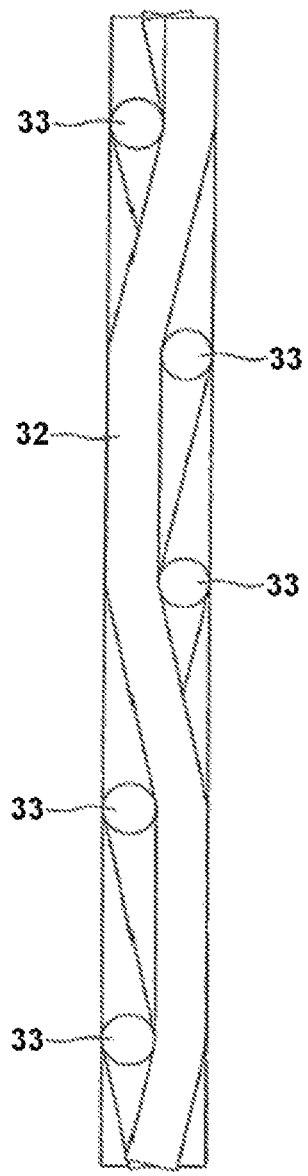
Fig. 4
Fig. 5

FABRIC LAYER, FLAT MATERIAL, FILTER ELEMENT, FILTER AND METHOD FOR THE PRODUCTION OF A FABRIC LAYER

The invention relates to a fabric layer for a corrugated or pleated flat material of a filter element with the features of the preamble of claim 1. Such a fabric layer is known for example from WO 2009/026978 A2. The invention further relates to a flat material with such a fabric layer, a filter element, a filter and a method for the production of a fabric layer.

Foreign matter, for example contaminating particles, can be removed from a fluid by means of such flat materials, so that the content of foreign matter in the fluid can be reduced by flowing through the flat material. In order to increase the effective area of the flat material, the latter is pleated or corrugated. The effectively usable area is thus increased, without the external dimensions of the flat material having to be increased. Such a flat material is also called a filter bellows. The load on the flat material due to the fluid flowing through can have an effect such that the pleats or corrugations on the downstream side of the flat material lie close beside one another. This increases the flow resistance of the flat material and therefore the pressure loss of the fluid flowing through the flat material. With the known flat material, therefore, provision is made such that the fabric layer is capable of being deformed and comprises a twill weave. The mechanical loading capacity of a corrugated or pleated flat material produced in such a fabric layer is thus increased and the risk of damage with alternating pressure loads is reduced. Despite the high mechanical loading capacity, the known flat material is characterised by a low flow resistance on account of the twill weave.

Rework costs can arise in the processing of the known fabric layer to form a flat material, since the threads of the fabric layer can become locally detached from the fabric layer at specific points during the processing.

The problem underlying the invention is to improve a fabric layer of the type mentioned at the outset for a corrugated or pleated flat material of a filter element, in such a way that the processing of the fabric layer is simplified. The problem underlying the invention is also to specify a flat material, a filter element, a filter and a method for the production of a fabric layer.

Specifically, the problem is solved by a fabric layer for a corrugated or pleated flat material of a filter element, wherein the flat material comprises a plurality of pleats or corrugations running parallel to one another, which form successive pleat or corrugation peaks and pleat or corrugation troughs, which are connected to one another by a pleat flank. A fluid can flow through the flat material. The fabric layer comprises a first fabric region, in particular a first fabric strip, and at least one second fabric region, in particular a second fabric strip. The threads of the first fabric region, in particular of the first fabric strip, and of the second fabric region, in particular of the second fabric strip, merge into one another. The threads are in particular weft threads. The first fabric region, in particular the first fabric strip, comprises a first type of weave and the second fabric region, in particular the second fabric strip, a second type of weave. The second type of weave differs from the first type of weave. The fabric layer according to the invention can be a protective fabric and/or a backing fabric for a corrugated or pleated flat material of a filter element.

The first fabric region is preferably a first fabric strip, i.e. an elongated formation, which extends ribbon-like in the fabric layer. The same applies to the second fabric region, which preferably forms a second fabric strip. Other geometries are possible. The advantages of the invention are described below on the basis of fabric strips, but they apply in like manner to the general fabric regions.

The invention has the advantage that locally different functions or properties of the fabric layer can be adjusted by the selection of the corresponding type of weave. This is achieved by the fact that the type of weave of the fabric layer changes in the transition from the first to the second fabric strip. The change in the types of weave enables a different function or property in the region of the first type of weave of the fabric layer from in the region of the second type of weave of the fabric layer, since the first and second type of weave differ from one another.

For example, it is possible to use a second type of weave different from the first type of weave in critical regions during the processing of the fabric layer, said second type of weave enabling better fixing of the threads in the fabric layer than in the region of the first type of weave. The processing of the fabric layer is thus simplified, since rework of the flat material at least with regard to the fabric layer is not required.

The invention is not limited to the simplification of the processing. On the contrary, the invention quite generally permits the local adjustment of specific functions or properties of the fabric layer, as a result of which the performance of the filter element for example can be improved. This is achieved by the different types of weave of the fabric layer.

The invention is not limited to two different types of weave. It is possible for more than two, for example three or four types of weave to be used, which in each case differ from the first type of weave.

Preferred embodiments of the invention are given in the sub-claims.

In a particularly preferred embodiment, the second fabric strip forms a fixing weave, which fixes the threads, in particular the warp threads of the first fabric strip. This embodiment is particularly well suited for simplifying the processing of the fabric layer, because, as a result of the second type of weave, the threads are prevented from becoming detached from the fabric layer. This embodiment is particularly well suited precisely for fixing the edge threads of the fabric layer.

The second type of weave of the second fabric strip preferably comprises a linen weave (also referred to as a plain weave) or a leno weave. It has been shown that the linen weave or the leno weave enable better fixing of the threads, in particular the warp threads, in the fabric layer than for example a twill weave. As a result of the combination of the different types of weave, the optimum properties of the respective type of weave are retained and used in a targeted manner to improve the properties of the fabric layer.

In a further preferred embodiment, the second fabric strip forms the edge, in particular the front-side edge, of the fabric layer. Also advantageously, a second fabric strip in each case forms the two front-side edges of the fabric layer. A front-side edge of the fabric layer is understood to mean the edge which, in the flat material into which the fabric layer is integrated, is arranged at the front side in the axial direction of the filter element, i.e. in the region of the respective end disc of the filter element. In other words, the front-side edge of the cylindrical flat material in the assembled state forms the upper edge or the lower edge of the flat material.

The fixing of the warp threads is relevant in this region, so that this embodiment in particular simplifies the processing of the fabric layer.

A plurality of second fabric strips are preferably arranged spaced apart, wherein the first fabric strip is arranged between two second fabric strips. This embodiment comprises different variants. For example, the two front-side edges of the fabric layer can be formed in each case by a second fabric strip, wherein a first fabric strip is arranged between the two second fabric strips. This embodiment is primarily intended to simplify the processing of the fabric layer. It is also possible for three or more second fabric strips to be provided, between which a first fabric strip is arranged in each case, in order to form different functional regions of the fabric layer. Moreover, an intermediate product of the fabric layer is protected by this embodiment, said intermediate product being transformed by appropriate cutting into the end product, i.e. for example a fabric layer with two second fabric strips and one first fabric strip in between.

The first fabric strip, in particular the main fabric, can have a larger area than the second fabric strip. As a result, the flow properties of the flat material are determined mainly by the first fabric strip of the fabric layer.

In a further embodiment, the first fabric strip forms during use a flow region of the corrugated or pleated flat material through which the fluid can flow, wherein the flow region has a flow resistance which is less than the flow resistance of the second fabric strip.

In a particularly preferred embodiment, the first type of weave of the first fabric strip, in particular the main fabric, has a twill weave, in particular an alternating twill weave, in particular a herringbone twill weave, or an atlas weave. The twill weave has the advantage that the mechanical loading capacity of the corrugated or pleated flat material produced with such a fabric layer is increased and the risk of damage with alternating pressure loads is reduced. Moreover, the flat material thus formed has a low flow resistance.

The combination of a twill weave for the first fabric strip and a linen weave or a leno weave for the second fabric strip is particularly preferable. The invention is not limited to this combination, but rather also extends to other combinations of types of weave.

The first fabric strip, in particular the main fabric, and/or the second fabric strip can form a hybrid fabric with first and second threads, wherein the first threads, in particular the warp threads, are formed from plastic and the second threads, in particular the weft threads, from metal. The useful life of the flat material is thus extended.

The claimed flat material comprises at least one fabric layer according to the invention. Regarding the advantages of such a flat material, reference is made to the embodiments in connection with the fabric layer.

The same applies to the filter element with such a flat material. In a preferred embodiment of the filter element, the flat material has a hollow-cylindrical shape and is connected at at least one front face to an end disc. A second fabric strip of the fabric layer is at least partially covered by the end disc. Advantageously, the effect of this is that, for example in the case of the fixing of the edge threads of the second fabric strip with the second type of weave, no part of the effective surface of the filter element is involved, i.e. no fluid flows through.

The second fabric strip can be arranged at least partially in the adhesive bed of the end disc and thus lies in a region of the filter element through which no flow takes place. The drawback of the second fabric strip with regard to flow behaviour does not therefore have any effect on the pressure loss of the filter element.

The claimed filter comprises a filter element according to the invention, i.e. a filter element in a flat material, which comprises a fabric layer according to the invention.

In the method according to the invention for the production of a fabric layer for a corrugated or pleated flat material of a filter, a first fabric strip and at least one second fabric strip are woven, the threads whereof, in particular weft threads, merging into one another. A switch is made during weaving from a first type of weave of the first fabric strip to a second type of weave of the second fabric strip. The second type of weave differs from the first type of weave.

In an advantageous embodiment of the method, a functional layer of the flat material is connected to the fabric layer according to the invention.

The invention is explained in greater detail below with the aid of an example of embodiment with further details, reference being made to the appended schematic drawings.

In the figures:

FIG. 4 shows a cross-section of the second fibre strip with the type of weave "linen weave" according to FIG. 2 and FIG. 5 shows a cross-section through the first fabric strip with the type of weave "twill weave" according to FIG. 2.

Figure 1:
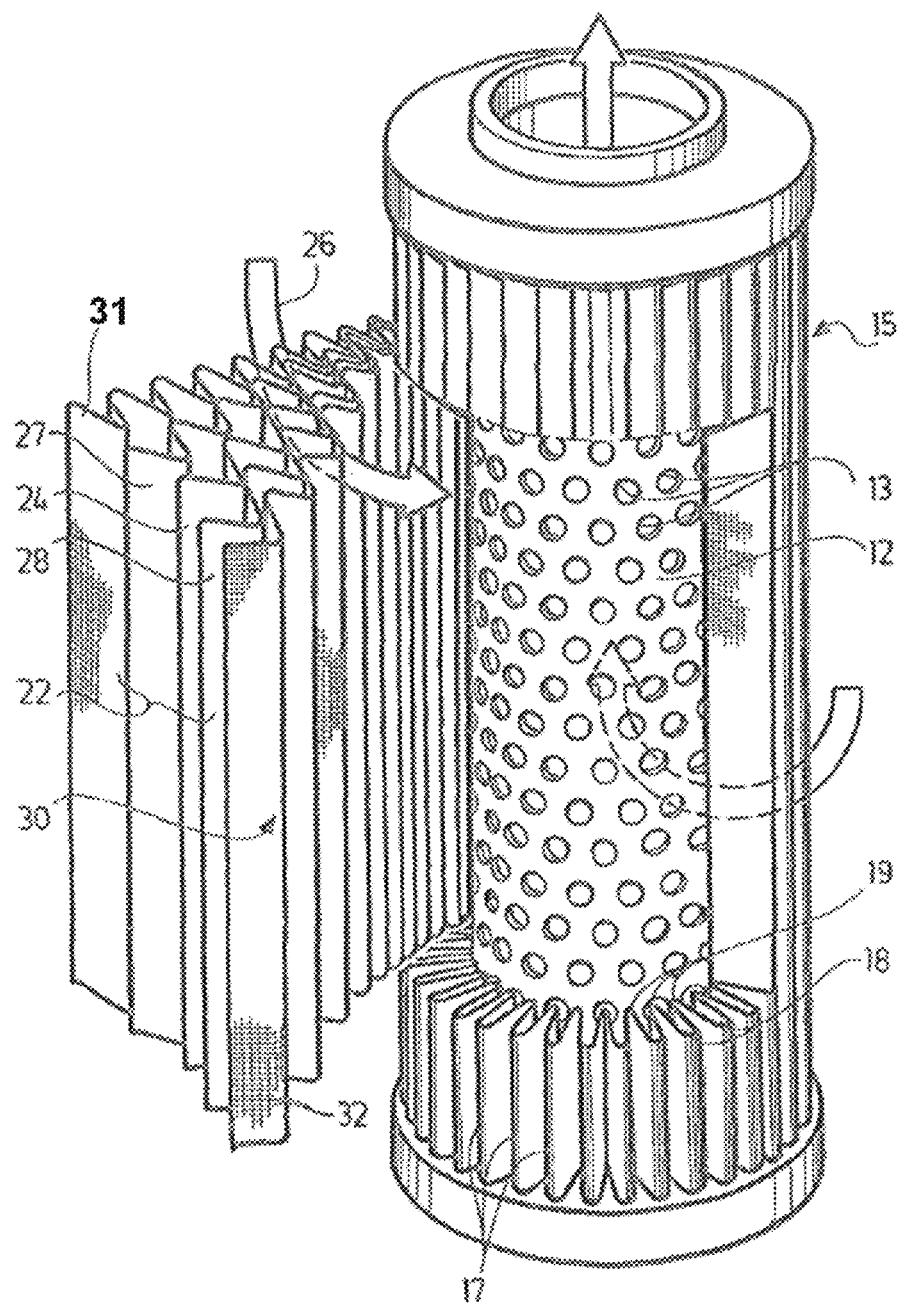
FIG. 1 shows a perspective view of a filter element with partially cut-away filter bellows or pleated flat material.

FIG. 1 represents diagrammatically a filter element, which is used for example in a hydraulic filter. The use in a hydraulic filter is particularly preferable. It is possible to use the filter element in other filters. It comprises a perforated casing or a cylindrical support tube 12 through which a plurality of flow openings 13 pass in the radial direction. In the circumferential direction, support tube 12 is surrounded by a multi-layer filter bellows 15, which for illustration is represented in FIG. 1 partially in the manner of an exploded drawing. Filter bellows 15 can also be referred to as corrugated or pleated flat material. Filter bellows 15 is pleated in a star-shaped manner by pleats 17 running parallel to the longitudinal axis of support tube 12, in such a way that radially outer pleat peaks 18 and radially inner pleat bases 19 alternately follow one another along its circumference.

Filter bellows 15 specifically comprises a three-layer filter material 22 with a fine-filter layer in the form of a fleece 24, which in flow direction 26, i.e. in the represented embodiment in the radial direction from outside inwards, is covered on the inflow side by a pre-filter fleece 27 and on the outflow side by a protective fleece 28. The fleeces can be produced for example from a plastic or glass fibre material. The invention is not limited to such a filter material, but rather is also suitable for other filter materials which are provided for filtration, for example with more or fewer than three layers.

In flow direction 26, filter material 22 is supported on the outflow side on a backing fabric 30, which lies over its area against protective fleece 28 of filter material 22 and is also pleated star-shaped. Backing fabric 30 is in turn supported in flow direction 26 in the region of pleat bases 19 on support tube 12. On the inflow side, i.e. radially outside, a protective fabric 31 is arranged which lies over its area against pre-filter fleece 27 of filter material 22 and is also pleated star-shaped. Backing fabric 30 and protective fabric 31 are each produced from a fabric layer according to the example of embodiment according to the invention, which is explained in greater detail with the aid of FIG. 2. It is possible for only backing fabric 30 or only protective fabric 31 to be produced from the fabric layer described in greater detail below.

Figure 2:
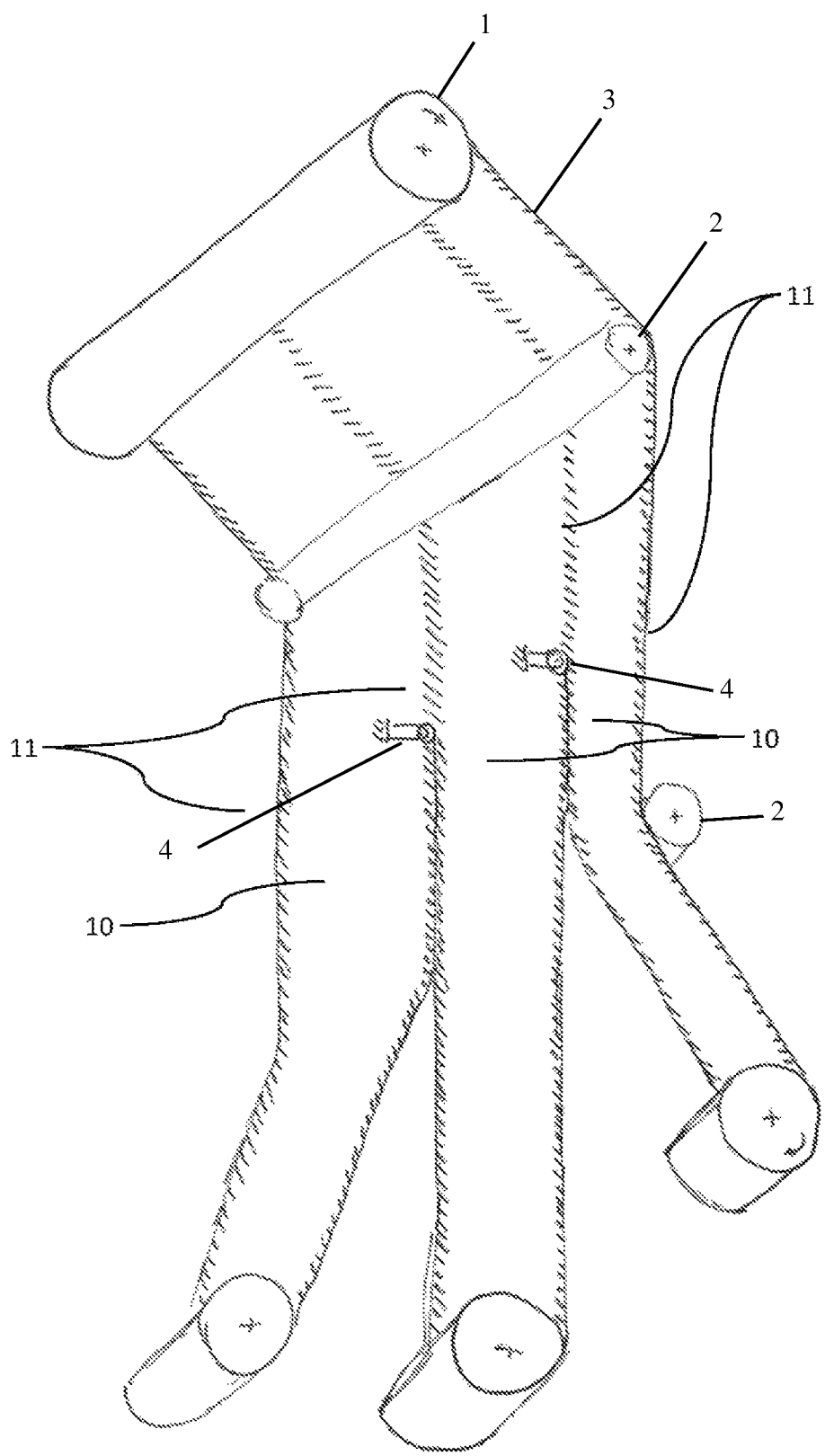
FIG. 2 shows a perspective view of a fabric layer according to an example of embodiment according to the invention during production, which is integrated into the filter bellows according to FIG. 1.

In FIG. 2, it is shown that the fabric layer according to the example of embodiment according to the invention comprises a first fabric strip 10. First fabric strip 10 can also be referred to as the main fabric. The main fabric is characterised in that it enables the main function of the filter element, i.e. the flow through filter material 22 required for the filtration. First fabric strip 10 thus comprises a particularly large effective area. First fabric strip 10 extends in the longitudinal direction of the fabric layer according to FIG. 2. In the assembled state, i.e. in the filter element, first fabric strip 10 extends in the circumferential direction of the filter element.

First fabric strip 10 merges into a second fabric strip 11, which extends essentially parallel to first fabric strip 10. It is possible for second fabric strip 11 to have an offset of at least one warp thread, in particular of a plurality of warp threads. Alternatively, a zigzag-shaped course of second fabric strip 11 is possible. Specifically, the weft threads of first fabric strip 10 merge into the weft threads of second fabric strip 11. The two fabric strips 10, 11 thus use the same weft threads and thus form a uniform or coherent fabric layer, which extends at least in the production state in one and the same plane. When the fabric layer is integrated into the flat material or filter bellows 15, the latter forms the same star-shaped contour as filter material 22. The flat material and therefore the fabric layer is corrugated or pleated.

As indicated in FIG. 2 by the shading, first fabric strip 10 has a first type of weave and second fabric strip 11 a second type of weave, which differs from the first type of weave. The effect of this is that different properties of the fabric layer are created in the regions of first fabric strip 10 and second fabric strip 11. For example, the threads of the fabric layer in the region of second fabric strip 11 can be fixed more firmly by the second type of weave than the threads of the fabric layer in the region of first fabric strip 10.

As can be seen in FIG. 2, a different number of first and second fabric strips 10, 11 can be provided. In the example according to FIG. 2, three first fabric strips 10 and four second fabric strips 11 are provided, wherein first fabric strips 10 each extend between two fabric strips 11.

In the example according to FIG. 2, the entire fabric layer is cut in such a way that partial fabric layers arise, which each comprise a first fabric strip 10 and two second fabric strips 11, which extend along the edges of the fabric layer. When in use, the edges of the partial fabric layers form the front-side edges of filter bellows 15, as can be seen in FIG. 1. Three partial fabric layers are formed in the example according to FIG. 2. The width of the partial fabric layers can differ. The width depends on the distance of the two fabric strips 11 from one another. This has the advantage that the fabric layer can be customised for different filter bellow sizes.

It is also possible to produce a single fabric layer with a plurality of first fabric strips 10, which are separated by second fabric strips 11, similar to the entire fabric layer before the cutting, i.e. uncut fabric 3. The filter element can thus comprises different flow regions with different properties, which are created by the suitable selection of the respective type of weave for first and second fabric strips 10, 11.

In the example of embodiment according to FIG. 2, the main fabric, i.e. first fabric strip 10, is produced in the type of weave "twill weave". Second fabric strips 11 are each produced in the type of weave "linen weave".

Other combinations of types of weave are possible. Thus, the first type of weave of first fabric strip 10 can specifically have an alternating twill weave or a herringbone twill weave. It is also possible for the first type of weave to comprise an atlas weave. The second type of weave can comprise a linen weave or plain weave, as in FIG. 2, or a twill weave. These two types of weave are characterised in that they fix the warp threads securely in the fabric layer (fixing weave).

Figure 3:
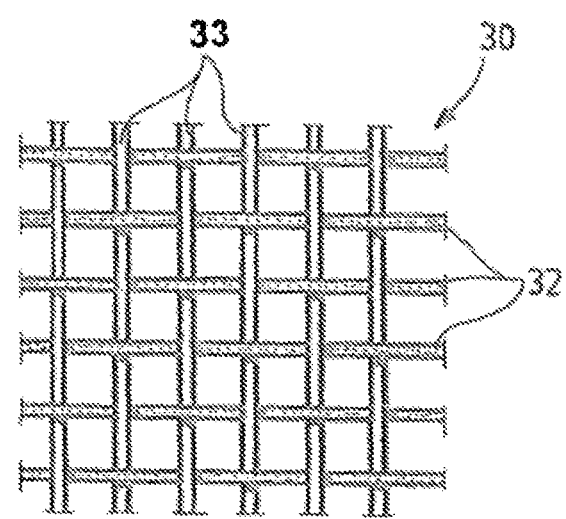
FIG. 3 shows a detail of a second fabric strip of the fabric layer according to FIG. 2, wherein the type of weave "linen weave" is implemented.

An example of a linen weave (second type of weave) is represented in FIG. 3 and FIG. 4. In the case of the linen weave, weft threads 32 run alternately over and under a warp thread 33. The cross-overs of weft threads 32 and warp threads 33 takes place according to a 1:1 pattern. Second fabric strips 11 are characterised by a high slip resistance. The threads, in particular the warp threads of second fabric strips 11, are fixed by the linen weave securely in the fabric composite.

An example of a twill weave (first type of weave) is shown in FIG. 5. In contrast with the linen weave according to FIG. 4, weft threads 32 of the first fabric strip 10 run under two warp threads 33, after which they run over two warp threads 33, then again reach under two warp threads 33 and so on. The immediately adjacent weft thread displaces this rhythm by one to the side. Weft rises 38 thus extend over two adjacent warp threads, the same applying to weft falls 39.

If two sections of the employed fabric layer with a twill weave in the region of first fabric strip 10 or in the regions of first fabric strips 10 come to lie directly against one another due to pleating or corrugation, thread or filament sections projecting in the downstream direction, in particular mutually facing and intersecting warp and weft rises, lie against one another. The total thickness of the sections of the fabric with a twill weave lying against one another due to pleating or corrugation is greater than the total thickness of the sections of the fabric with linen weave lying against one another due to pleating or corrugation. Micro-channels are formed between the sections of the fabric with a twill weave lying against one another due to pleating or corrugation, which micro-channels are not impaired by a slight relative movement of the two sections, but rather retain their formation in a stable manner.

As a result of the combination of the different types of weave, different properties of the fabric layer are thus created locally, which significantly reduce the re-work costs in the production of the filter elements, for example in the case of the linen weave at the edges of the fabric layer, because the edge threads are fixed in the fabric composite.

In addition, there is the fact that the arrangement of the two fabric strips 11 at the front-side edges of the fabric layer, as shown in FIG. 2, leads to the regions with the two types of weave, i.e. second fabric strips 11, dipping into end discs 38, 40 and not therefore participating in the effective flow area of the filter element.

To sum up, the fabric layer is not woven consistently in one and the same type of weave, for example in a twill weave, as in the prior art. On the contrary, at the points at which the fabric layer is subsequently cut, i.e. to defined ribbon widths, a strip with a specific number of warp threads is woven in each case in another type of weave, in particular into a linen weave or plain weave. The main advantage consists in the fact that, as result of the linen weave at the edge, the edge thread is fixed in the fabric much better due to the more frequent switching, i.e. the more frequent offsetting of the thread, than in the case of a pure twill weave. The edge thread thus has a very much reduced tendency to jump out or be pulled out from the fabric.

Within the scope of the invention, the filter element with a filter bellows is claimed in addition to the fabric layer, into which filter bellows at least one fabric layer according to the example of embodiment according to the invention is integrated. Specifically, the filter bellows contains a plurality of material layers, which are pleated with one another in order to form a star-shaped pattern. One or two of these layers (upstream or downstream side) is made of a twill fabric, which has a favourable effect on the performance data and in particular the pressure loss of the filter element. Specifically, first fabric strip 10 is constituted in this manner. The intrinsically existing drawback of the fabric optimised with regard to the pressure loss consists in the fact that the edge threads in the twill weave are only slightly bound in the fabric, so that during the pleating process and subsequent processing steps, such as for example the separating of the pleated bellows, the edge threads are not held sufficiently well in the fabric composite, as a result of which additional re-work arises.

The twill fabric used for the main fabric or generally the first fabric strip with the first type of weave is supplemented by the fact that, at the edges, or where cuts are made to smaller ribbon widths after the weaving, a second type of weave is used, specifically the plain linen weave. The number of warp threads that are woven into the plain weave is ideally selected at maximum such that this part of the fabric disappears in the adhesive bed of the end discs of the filter element and does not therefore influence the performance data of the filter element.

In addition, further zones or strips with plain weave can also be introduced between the actual cutting lanes, in order for example to create flexible possibilities after weaving of being able to cut to different ribbon widths. Instead of plain weave at the edge, i.e. in the second fabric strip, other types of weave differing from the actual first type of weave of the fabric can also be considered at the edge, which hold the edge thread much better in the fabric than the twill weave. Here, the leno weave for example comes into question. The manual rework due to jumping-out of edge threads is not required, as a result of which a significant improvement in production for the manufacture of the filter element is to be noted.

LIST OF REFERENCE NUMBERS 1 parent roll
2 roll for cutting
3 uncut fabric
4 cutting knife
5 first fabric strip
11 second fabric strip
12 support tube
13 flow openings
14 free
15 filter bellows
16 free
17 pleats
18 pleat peaks
19 pleat bases
20 free
21 free
22 filter material
23 free
24 fleece
25 free
26 flow direction
27 pre-filter fleece
28 protective fleece
29 free
30 backing fabric
31 protective fabric
32 weft threads
33 warp threads

The invention claimed is:

1. A flat material for a filter element, wherein the flat material has a corrugated or pleated form with a plurality of pleats or corrugations running parallel to one another, and a fluid can flow through the flat material, and the flat material comprising:
at least one functional layer for removing foreign matter out of the fluid; and
at least one fabric layer connected to the at least one functional layer, the at least one fabric layer including a first fabric layer comprising a first fabric strip and a second fabric strip, the first fabric strip and the second fabric strip use same the weft threads, wherein the first fabric strip comprises a first type of weave and the second fabric strip comprises a second type of weave- different from the first type of weave,
wherein a first section of the first fabric strip with the first type of weave lays against a second section of the first fabric strip with the first type of weave forming micro-channels between the first section of the first fabric strip and the second section of the first fabric strip.

2. The flat material of claim 1, wherein
the second type of weave of the second fabric strip in the first fabric layer is a fixing weave that fixes the warp threads in the first fabric layer, and
the first type of weave of the first fabric strip in the first fabric layer is a weave having a lower flow resistance than the second type of weave.

3. The flat material of claim 1, wherein the first fabric layer comprises a plurality of the second fabric strips which are spaced apart from each other, wherein the first fabric strip is arranged between two of the second fabric strips of the plurality of the second fabric strips in a width direction of the first fabric layer, and the two of the second fabric strips form opposing longitudinal edges of the first fabric layer.

* * * * *